United States Patent
Suzuki et al.

(10) Patent No.: US 8,406,321 B2
(45) Date of Patent: Mar. 26, 2013

(54) DIGITAL SIGNAL TRANSMISSION METHOD, TRANSMITTING APPARATUS, AND RECEIVING APPARATUS

(75) Inventors: Toshinori Suzuki, Fujimino (JP);
Noriaki Miyazaki, Fujimino (JP);
Yasuyuki Hatakawa, Fujimino (JP)

(73) Assignee: KDDI Corporation, Tokyo (JP)

( * ) Notice: Subject to any disclaimer, the term of this patent is extended or adjusted under 35 U.S.C. 154(b) by 1122 days.

(21) Appl. No.: 12/091,439

(22) PCT Filed: Oct. 26, 2006

(86) PCT No.: PCT/JP2006/321405
§ 371 (c)(1),
(2), (4) Date: Dec. 31, 2008

(87) PCT Pub. No.: WO2007/049713
PCT Pub. Date: May 3, 2007

(65) Prior Publication Data
US 2009/0116542 A1    May 7, 2009

(30) Foreign Application Priority Data
Oct. 28, 2005    (JP) .................... P2005-315493

(51) Int. Cl.
*H04K 1/10*    (2006.01)
(52) U.S. Cl. ........................................ 375/260
(58) Field of Classification Search .................. 375/260, 375/285, 295, 298, 316, 340, 342, 346; 370/208–210
See application file for complete search history.

(56) References Cited

U.S. PATENT DOCUMENTS

| | | | |
|---|---|---|---|
| 6,819,681 B1 * | 11/2004 | Hariharasubrahmanian . | 370/498 |
| 6,888,903 B1 * | 5/2005 | Stenstrom et al. ............ | 375/350 |
| 7,529,315 B2 * | 5/2009 | Sudo ............................. | 375/295 |
| 7,583,736 B2 * | 9/2009 | Miyoshi et al. ................ | 375/260 |
| 7,782,965 B2 * | 8/2010 | Miyoshi ......................... | 375/260 |
| 2009/0016265 A1 * | 1/2009 | Katayama et al. ............ | 370/328 |

FOREIGN PATENT DOCUMENTS

| | | |
|---|---|---|
| JP | 2002198938 A | 7/2002 |
| JP | 2003046586 A | 2/2003 |
| JP | 2003527041 A | 9/2003 |
| JP | 2004-104574 | 4/2004 |
| JP | 2004-253828 | 9/2004 |
| JP | 2004297200 A | 10/2004 |

(Continued)

OTHER PUBLICATIONS

Garg, D. et al., *Analysis of the Optimum Spreading Factor for MC-CDMA with RCPT-coded HARQ*, Technical Report of the IEICE, The Institute of Electronics, Information and Communication Engineers, Mar. 15, 2003, pp. 61-68.

(Continued)

*Primary Examiner* — Khanh C Tran
(74) *Attorney, Agent, or Firm* — Morgan, Lewis & Bockius LLP

(57) ABSTRACT

In a digital signal transmission method according to the present invention, when N1 is the number of code multiplexes of a first transmit block including an information bit and part of a parity bit, and N2 is the number of code multiplexes of a subsequent transmit block including the remaining parity bit, a spread multiplexer 104 performs spread multiplexing of each block in a relationship of N1>N2.

12 Claims, 8 Drawing Sheets

FOREIGN PATENT DOCUMENTS

| | | | |
|---|---|---|---|
| JP | 2005006194 A | 1/2005 | |
| JP | 2005192175 A | 7/2005 | |
| WO | 01/69873 A2 | 9/2001 | |
| WO | WO 2005/062499 | 7/2005 | |

OTHER PUBLICATIONS

Takaoka, 'Throughput Characteristics of MC-CDMA HARQ using Adaptive Variable Diffusion Rate', *Shingaku Giho*, Institute of Electronics, Information and Communication Engineers (IEICE), Jul. 2005, RCS 2005-43, pp. 19-24.

Nobuhiko Miki et al., "Performance of Multipath Interference Canceller using Soft-Decision Replica Combined with Hybrid ARQ in High Speed Downlink Packet Access," Technical Report of IEICE RCS, Oct. 13, 2001, vol. 101, No. 371, pp. 99-104, RCS2001-165.

Japanese Office Action dated May 29, 2012, issued in corresponding Japanese patent application 2010-199285 (and English translation).

\* cited by examiner

FIG. 9   *PRIOR ART*
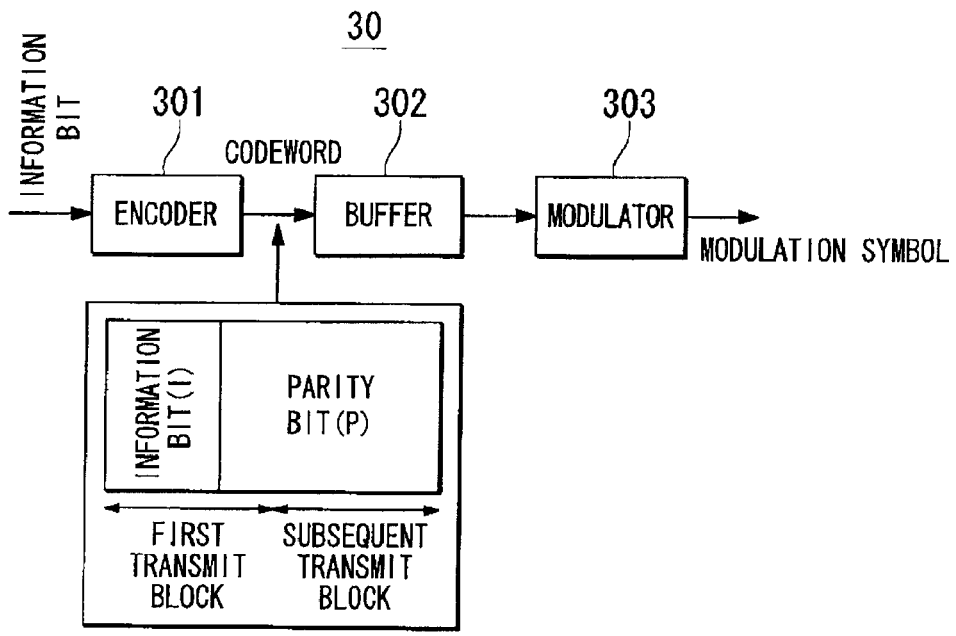
FIG. 10
*PRIOR ART*
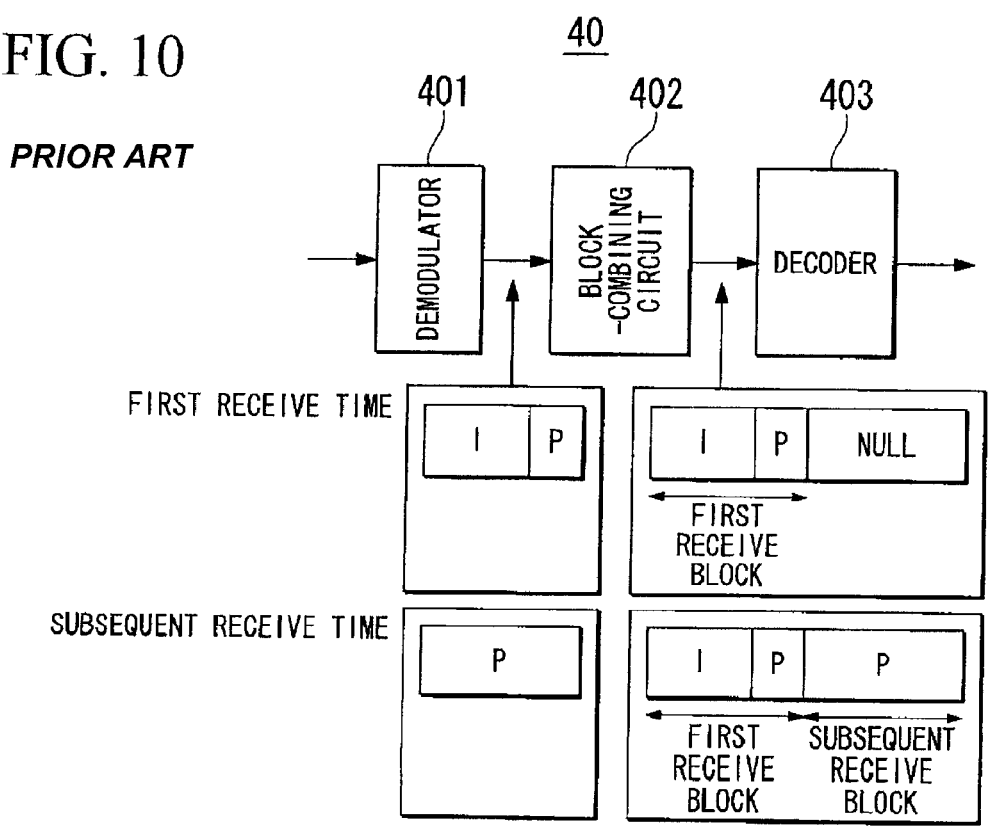

FIG. 11  *PRIOR ART*
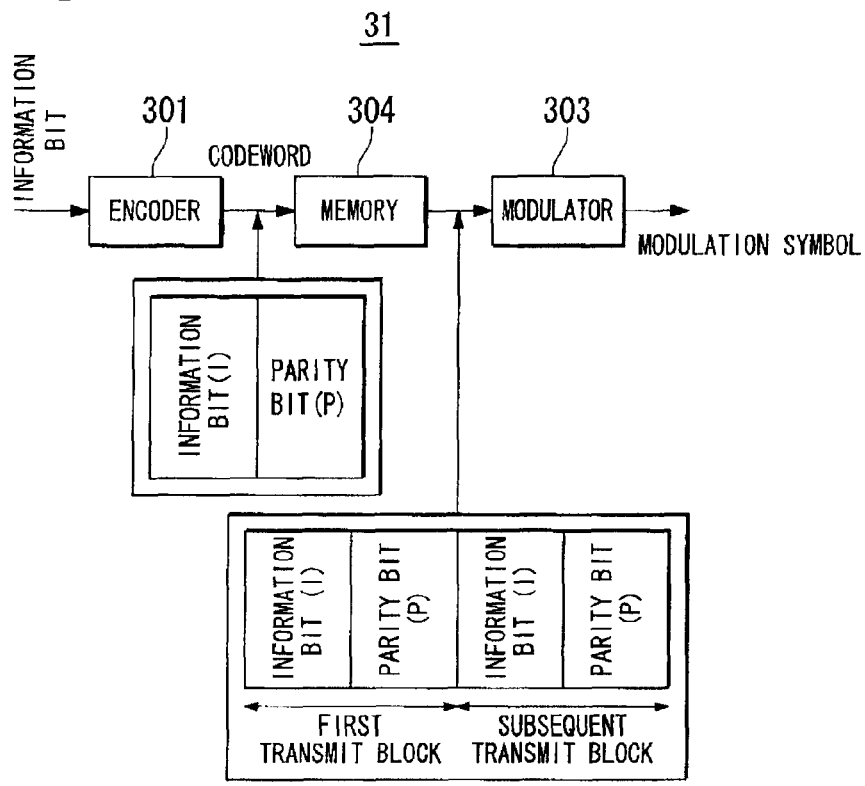
FIG. 12
*PRIOR ART*
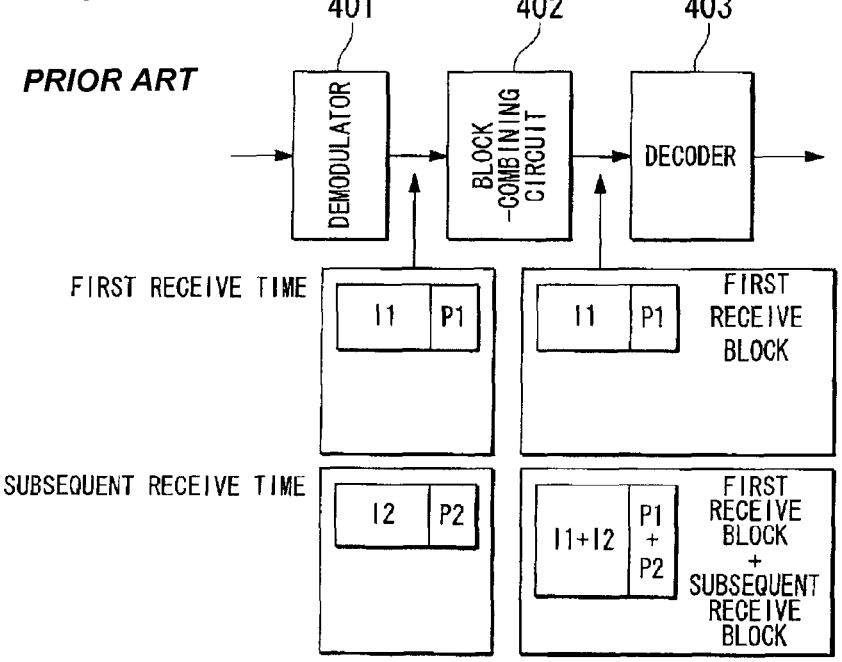

FIG. 13  *PRIOR ART*
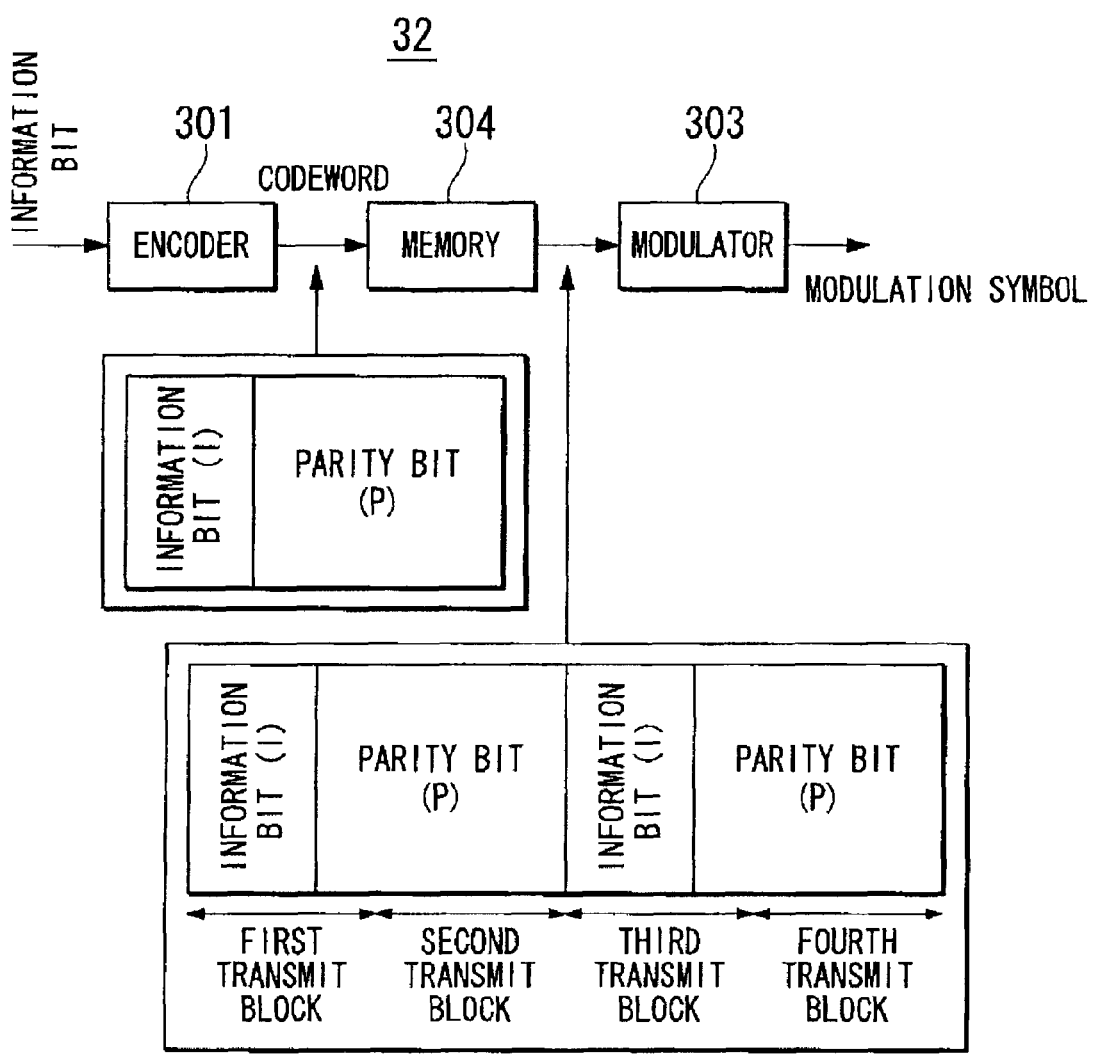

DIGITAL SIGNAL TRANSMISSION METHOD, TRANSMITTING APPARATUS, AND RECEIVING APPARATUS

Priority is claimed to PCT application no. PCT/JP2006/321405 (WO2007049713), filed on Oct. 26, 2006, and to Japanese Patent Application No. 2005-315493, filed Oct. 28, 2005. The entire contents of both of those applications are incorporated herein by reference.

TECHNICAL FIELD

The present invention relates to method of digital signal transmission method, a transmitting apparatus, and a receiving apparatus.

BACKGROUND ART

Conventionally, Hybrid Auto Repeat reQuest (HARQ) technology is known as a method of increasing transmission efficiency and transmission quality in digital signal transmission. HARQ is a transmission method that combines error-correction and retransmission-control. Specifically, it transmits a packet of transmit data that has been error-corrected, and, if that packet is not successfully received, transmits another packet created based on identical transmit data; the original transmit data is then successfully extracted from these multiple packets on the receiving side.

Representative examples of HARQ methods are Incremental Redundancy (IR) and Chase Combining, which will be explained using the drawings.

{IR Method}

FIG. 9 is a block diagram of a transmitting apparatus 30 that performs digital transmission using IR, and FIG. 10 is a block diagram of a similar receiving apparatus 40.

In FIG. 9, an information bit for transmission is input to an encoder 301 which corrects errors and outputs a codeword including an information bit and a parity bit. Of the output codeword, a first transmit block including the entire information bit and a bit including the front half of the parity bit, and a subsequent transmit block including the remaining parity bit, are accumulated in a buffer 302, and these blocks are sequentially input to a modulator 303. The modulator 303 modulates the input blocks to create corresponding modulation symbols, and a transmitter (not shown) transmits these modulation symbols. An information bit is thus transmitted by first transmitting a first transmit block, and then a subsequent transmit block.

In FIG. 10, a demodulator 401 demodulates an initially-received first receive block (corresponding to the first transmit block), and outputs it to a block-combining circuit 402. Since the subsequent transmit block has not yet been transmitted, the block-combining circuit 402 processes the untransmitted parity bit as a punctured (invalid) bit, and outputs the input first receive block unaltered to a decoder 403. The decoder 403 decodes the input block and extracts the information bit; since it does not used part of the parity bit in the entire original codeword in FIG. 1, the decoder 403 decodes it at a higher coding rate than when the entire codeword is used.

When the first receive block cannot be successfully decoded during this decoding process, the receiving apparatus side reports this fact to the transmitting apparatus side, and the receiving apparatus 30 that receives this report transmits a new subsequent transmit block.

While the subsequent receive block (corresponding to the subsequent transmit block) is demodulated and input to the block-combining circuit 402 in the same manner as above, this time, the first and subsequent receive blocks are sent to the decoder 403 after being combined in series. The decoder 403 decodes the entire combined block, and extracts the information bit. The coding rate at this time is lower than the coding rate when only the first receive block was decoded. Therefore, the error-correction ability of this decoding is enhanced, and decoding can be achieved more reliably than the first decoding.

{Chase Combining}

FIG. 11 is a block diagram of a transmitting apparatus 31 that performs digital transmission using chase combining, and FIG. 12 is a block diagram of a similar receiving apparatus 41.

In FIG. 11, in chase combining, a codeword is duplicated in a memory 304 and sent to a modulator 303. It is separated into a block for each duplicated unit (i.e. each original codeword), and these are sequentially output as a first transmit block and a subsequent transmit block. That is, in chase combining, the same data is transmitted in first and subsequent transmissions. The memory 304 can accomplish the same operation if it is provided in a rear stage of the modulator 303. That is, in chase combining, the same data is transmitted in first and subsequent transmissions. The memory 304 can accomplish the same operation if it is provided in a rear stage of the modulator 303.

In FIG. 12, a process identical to IR is performed to the first receive block. When a subsequent transmit block is transmitted after decoding was unsuccessful with only the first receive block, the block-combining circuit 402 combines the first and subsequent receive blocks at the same phase, and outputs this to the decoder 403. Since the power per bit of the input to the decoder 403 is greater than in the first time, decoding is more likely to be successful than the first time (unlike IR method, the coding rate does not change between first and subsequent times.)

Transmission can be performed by combining the above IR and chase combining methods, instead of using them separately. FIG. 13 is a block diagram of a transmitting apparatus 32 that performs transmission using such a combination. In FIG. 13, a codeword is duplicated in the memory 304, and then separated into four blocks (first transmit block to fourth transmit block) which are sent to the modulator 303. The first and third blocks include the same information bit and part of the parity bit as the first transmit block in IR method, while the second and fourth blocks include the same remaining parity bit as the subsequent transmit block in IR method.

On the receiving side (a block diagram of the corresponding receiving apparatus is not shown), a process performed when the first and second receive blocks are received is the same as in the IR method described above, whereas, when the third and fourth blocks are received, these newly received blocks are combined at the same phase with the blocks that are already received, and decoded, in the same manner as in chase combining described above.

When applying the various HARQ techniques described above in a multicarrier transmission system using a great number of frequency-divided carriers, while transmission parameters are usually made the same for every transmit block, Non-Patent Literature 1 introduces a method of partially increasing throughput in which, when using IR, preferably, Walsh code spread multiplexing transmission is performed only when transmitting a first transmit block including only an information bit, and code spread multiplexing is not performed when transmitting a parity bit {Non-Patent Document 1} Takaoka, 'Throughput Characteristics of MC-CDMA HARQ using Adaptive Variable Diffusion Rate', Shingaku Giho, Institute of Electronics, Information and Communication Engineers (IEICE), July 2005, RCS 2005-43, pp. 19-24.

In the digital signal transmission method using IR described above, while frequency diversity is achieved by transmitting many parity bits in second and later transmissions, a downside is that deterioration factors such as inter-code interference due to de-spreading of the spread multiplex signal become conspicuous. In chase combining, since the receive S/N increases due to block combining in second and later transmissions, this method does not offer the advantage of relatively reducing the effects of inter-code interference. Thus, since conventional HARQ methods do not always optimize the transmission parameters, throughput becomes problematic, and high-quality transmission cannot be realized.

DISCLOSURE OF THE INVENTION

The present invention has been realized in view of these points, and aims to provide a digital signal transmission method, a transmitting apparatus, and a receiving apparatus, that can increase throughput and achieve high-quality transmission.

The present invention has been realized in order to solve the above problems, and provides a digital signal transmission method for modulating a codeword obtained by coding information bits to be transmitted, and transmitting modulation symbols obtained by the modulation with dividing into two or more blocks, including the steps of transmitting a plurality of the modulation symbols on a plurality of subcarriers using spread multiplexing, and demodulating the spread multiplexed signal being regarded as a modulation symbol without de-spreading, wherein a number of code spreads of modulation symbols contained in the block earlier in the transmission sequence is greater than a number of code spreads of modulation symbols contained in the block later in the transmission sequence.

The invention also provides a digital signal transmission method for modulating a codeword obtained by coding information bits to be transmitted, and transmitting modulation symbols obtained in the modulation with dividing into two or more blocks, including the steps of transmitting a plurality of the modulation symbols on a plurality of subcarriers using rotation code multiplexing, wherein the angle of a rotation code applied to modulation symbols contained in the block early in the transmission sequence is greater than the angle of a rotation code applied to the block later in the transmission sequence, where a rotation angle of 0° achieves a signal point arrangement identical to that of a non-multiplexed signal, a rotation angle of 45° achieves a signal point arrangement equivalent to that of a signal multiplexed with a Walsh-Hadamard code, and the angle of a rotation code θ is defined as $0° \leq \theta \leq 45$.

The invention also provides a digital signal transmission method for modulating a codeword obtained by coding information bits to be transmitted, and transmitting modulation symbols obtained in the modulation with dividing into two or more blocks, including the steps of obtaining a plurality of identical modulation symbols by duplicating and then modulating the codeword, or by modulating and then duplicating the codeword, transmitting the plurality of identical modulation symbols on a plurality of subcarriers using spread multiplexing, and demodulating the spread multiplexed signal being regarded as a modulation symbol without de-spreading, wherein the number of code multiplexes of modulation symbols contained in the block early in the transmission sequence is greater than the number of code multiplexes of modulation symbols contained in the block later in the transmission sequence.

The invention also provides a digital signal transmission method for modulating a codeword obtained by coding information bits to be transmitted, and transmitting modulation symbols obtained in the modulation with dividing into two or more blocks, including the steps of obtaining a plurality of identical modulation symbols by duplicating and then modulating the codeword, or by modulating and then duplicating the codeword, and transmitting the plurality of identical modulation symbols on a plurality of subcarriers using rotation code multiplexing, wherein the angle of a rotation code applied to modulation symbols contained in the block early in the transmission sequence is greater than the angle of a rotation code applied to the block later in the transmission sequence, where a rotation angle of 0° achieves a signal point arrangement identical to that of a non-multiplexed signal, a rotation angle of 45° achieves a signal point arrangement equivalent to that of a signal multiplexed with a Walsh-Hadamard code, and the angle of a rotation code θ is defined as $0° \leq \theta \leq 45$.

The invention also provides a digital signal transmission method for modulating a codeword obtained by coding information bits to be transmitted, and transmitting modulation symbols obtained by the modulation with dividing into two or more blocks, including the steps of starting decoding before receiving all the divided blocks, predicting a receive probability of modulation symbols contained in an un-received block that has not yet been received based on the receive probability of decoded modulated symbols, and when receiving the un-received block and demodulating a modulation symbol contained in that block, determining a channel value based on the predicted receive probability.

In transmitting and/or receiving using the digital signal transmission method described above, when the information bits are successfully decoded based on a decoded result up to that point before all the divided blocks are received, the method may include the step of sending a report to the transmitting side so as to terminate transmission of the remaining blocks.

In transmitting and/or receiving using the digital signal transmission method described above, when the information bits are not successfully decoded based on a decoded result up to that point before all the divided blocks are received, the method may includes the step of sending a report to the transmitting side so as to transmit the remaining blocks.

The invention also provides a transmitting apparatus that modulates a codeword obtained by coding information bits to be transmitted, and transmits modulation symbols obtained by the modulation with dividing into two or more blocks, including a spread multiplexing unit that performs spread multiplexing whereby, when a plurality of the modulation symbols are transmitted on a plurality of subcarriers using spread multiplexing, and the spread multiplexed signal is regarded as a modulation symbol and demodulated without de-spreading in a receiving apparatus, a number of code spreads of modulation symbols contained in the block earlier in the transmission sequence is greater than a number of code spreads of modulation symbols contained in the block later in the transmission sequence.

The invention also provides a transmitting apparatus that modulates a codeword obtained by coding information bits to be transmitted, and transmits modulation symbols obtained by the modulation with dividing into two or more blocks, including a spread multiplexing unit that performs rotation code multiplexing such that the angle of a rotation code applied to modulation symbols contained in the block early in the transmission sequence is greater than the angle of a rotation code applied to the block later in the transmission sequence, where a rotation angle of 0° achieves a signal point arrangement identical to that of a non-multiplexed signal, a rotation angle of 45° achieves a signal point arrangement equivalent to that of a signal multiplexed with a Walsh-Hadamard code, and the angle of a rotation code θ is defined as 0°≦θ≦45.

The invention also provides a transmitting apparatus that modulates a codeword obtained by coding information bits to be transmitted, and transmits modulation symbols obtained by the modulation with dividing into two or more blocks, including a spread multiplexing unit that, when a plurality of the modulation symbols are transmitted on a plurality of subcarriers using spread multiplexing, and the spread multiplexed signal is viewed as a modulation symbols and is demodulated without de-spreading at the receiving apparatus, performs code multiplexing to a plurality of identical modulation symbols obtained by duplicating and then modulating the codeword, or by modulating and then duplicating the codeword, such that the number of code multiplexes of modulation symbols contained in the block early in the transmission sequence is greater than the number of code multiplexes of modulation symbols contained in the block later in the transmission sequence.

The invention also provides a transmitting apparatus that modulates a codeword obtained by coding information bits to be transmitted, and transmits modulation symbols obtained by the modulation with dividing into two or more blocks, including a spread multiplexing unit that performs rotation code multiplexing to a plurality of identical modulation symbols obtained by duplicating and then modulating the codeword, or by modulating and then duplicating the codeword, such that the angle of a rotation code applied to modulation symbols contained in the block early in the transmission sequence is greater than the angle of a rotation code applied to the block later in the transmission sequence, where a rotation angle of 0° achieves a signal point arrangement identical to that of a non-multiplexed signal, a rotation angle of 45° achieves a signal point arrangement equivalent to that of a signal multiplexed with a Walsh-Hadamard code, and the angle of a rotation code θ is defined as 0°≦θ≦45.

The invention also provides a receiving apparatus, in digital signal transmission comprising modulating a codeword obtained by coding information bits to be transmitted, and transmitting modulation symbols obtained by the modulation with dividing into two or more blocks, including a demodulating unit that predicts a receive probability of modulation symbols contained in an un-received block that has not yet been received based on a receive probability of decoded modulated symbols, and, when receiving the un-received block and demodulating a modulation symbol contained in that block, determines a channel value based on the predicted receive probability.

According to the invention, since the blocks are transmitted while changing the number of code multiplexes per block or the angle of the rotation code, and demodulated after estimating probabilities of un-received receive bits from the probabilities of receive bits that are already decoded, transmission throughput can be increased and high-quality transmission can be achieved.

BRIEF DESCRIPTION OF THE DRAWINGS

FIG. 9 is a block diagram showing a conventional transmitting apparatus.

FIG. 10 is a block diagram showing a conventional receiving apparatus.

FIG. 11 is a block diagram showing a conventional transmitting apparatus.

FIG. 12 is a block diagram showing a conventional receiving apparatus.

FIG. 13 is a block diagram showing a conventional transmitting apparatus.

BEST MODE FOR CARRYING OUT THE INVENTION

Figure 1:
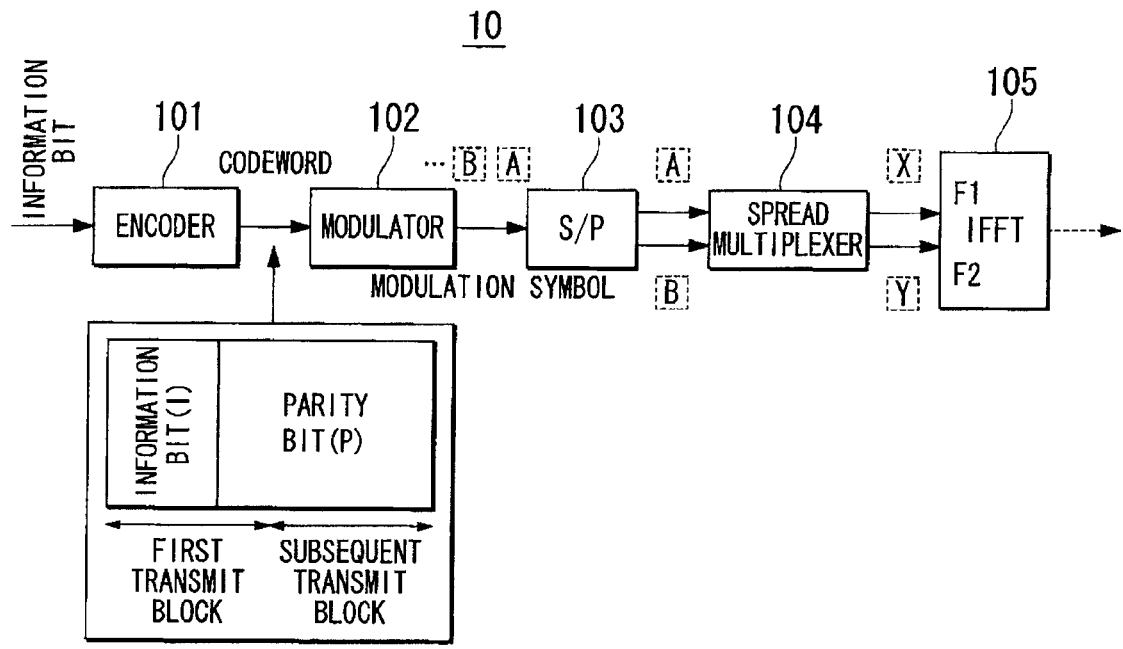
FIG. 1 is a block diagram showing a transmitting apparatus that operates by a digital signal transmission method according to a first embodiment.
Figure 2:
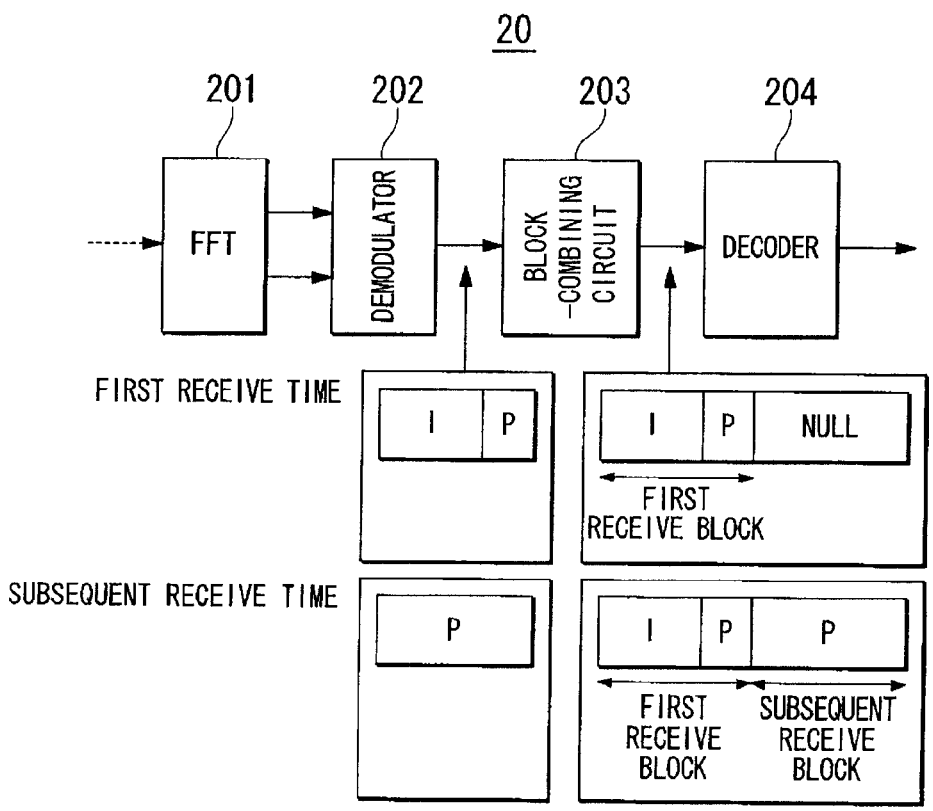
FIG. 2 is a block diagram showing a receiving apparatus that operates by a digital signal transmission method according to the first embodiment.

Embodiments of the invention will be explained in detail while referring to the drawings.
{First Embodiment}
FIGS. 1 and 2 are explanatory diagrams of a digital signal transmission method according to a first embodiment of the invention, FIG. 1 being a block diagram of a transmitting apparatus 10, and FIG. 2, a block diagram of a receiving apparatus 20. This embodiment is based on HARQ using IR.

In FIG. 1, an information bit for transmission is input to an encoder 101, which performs error-correction encoding and outputs a codeword including an information bit and a parity bit. Of the output codeword, a first transmit block including the entire information bit and a bit including the front half of the parity bit, and a subsequent transmit block including the remaining parity bit, are sequentially input to a modulator 102. The modulator 102 modulates the input bits to create corresponding modulation symbols, and sends them to a serial/parallel (S/P) converter 103. The modulation symbols input to the S/P converter will be expressed as A and B. Modulation symbols A and 1B are input to a spread multiplexer 104, which maps them to subcarriers F1 and F2. If the mapped symbols are expressed as X and Y, the spread multiplex operation can be expressed by the following equation 1.

$$\begin{pmatrix} X \\ Y \end{pmatrix} = C \begin{pmatrix} A \\ B \end{pmatrix} \qquad \text{[Equation 1]}$$

C is a 2×2 matrix, which applies a degree-2 spread multiplex code. A degree-4 spread multiplex code would be defined by a 4×4 matrix correlating four modulation symbols and four subcarriers. A Walsh-Hadamard matrix taking the degree as its length is one specific example of matrix C.

The symbols X and Y on the subcarriers in the above equation are passed through an inverse fast Fourier transform (IFFT) 105 and transmitted from a transmitter (not shown).

Subsequently in FIG. 2, a first receive block (corresponding to the first transmit block) is input to a demodulator 202 via a fast Fourier transform (FFT) 201, and, after demodulation, is output to a block-combining circuit 203. Since the subsequent transmit block is not transmitted at this time, the block-combining circuit 203 processes the non-transmitted parity bit as a punctured (invalid) bit, and outputs the inputted first receive block unaltered to a decoder 204. The decoder 204 decodes the inputted block and extracts the information bit.

When the first transmit block cannot be successfully decoded during this decoding, the receiving apparatus side report this fact to the transmitting apparatus side, and the transmitting apparatus 10 that receives this report newly transmits a subsequent transmit block.

When this is transmitted, a subsequent receive block (corresponding to the subsequent transmit block) is decoded and input to the block-combining circuit 203 as above; this time, however, the first and subsequent receive blocks are combined in series before being sent to the decoder 204. The decoder 204 decodes the entire combined block, and extracts the information bit.

In this embodiment, the spread multiplex degree of the block transmitted first (first transmit block) is higher than that of the transmit block transmitted subsequently (subsequent transmit block). By adjusting the transmission parameter in this way, (1) in the first transmission at a high coding rate, transmission characteristics can be enhanced by using a high-degree spread multiplex code that obtains a greater frequency diversity effect, and (2) in the second and later transmissions, since many parity bits are transmitted and combined in blocks, the coding rate decreases, achieving an ever high frequency diversity effect. Under these conditions, transmission characteristics can actually be better enhanced by suppressing features of spread multiplexing that lead to deterioration factors caused by inter-code interference and the like. However, since inter-code interference can be suppressed by demodulation without de-spreading the spread multiplex signal, low-degree spread multiplex signals are preferably used in second and later transmissions.

By optimizing the transmission parameters in the above manner, this embodiment can enhance transmission throughput more than in the related art, and achieve high-quality transmission.

{Second Embodiment}

In this embodiment, a rotation code is used as the spread multiplex code. In this case, instead of changing the degree of the spread multiplex in the block transmitted first and the block transmitted subsequently, the rotation angle of the rotation code is reduced for blocks later in the transmission sequence. By using such a transmission parameter, transmission throughput can be enhanced in the same manner as in the first embodiment. A degree-2 code is given by the rotation matrix represented in equation 2 below. Here, when angle that obtains a signal equivalent to a Walsh-Hadamard code is 45°, the angle θ is within a range of 0 to 45.

$$C = \begin{pmatrix} \cos\theta & \sin\theta \\ -\sin\theta & \cos\theta \end{pmatrix}$$ [Equation 2]

{Third Embodiment}

Figure 3:
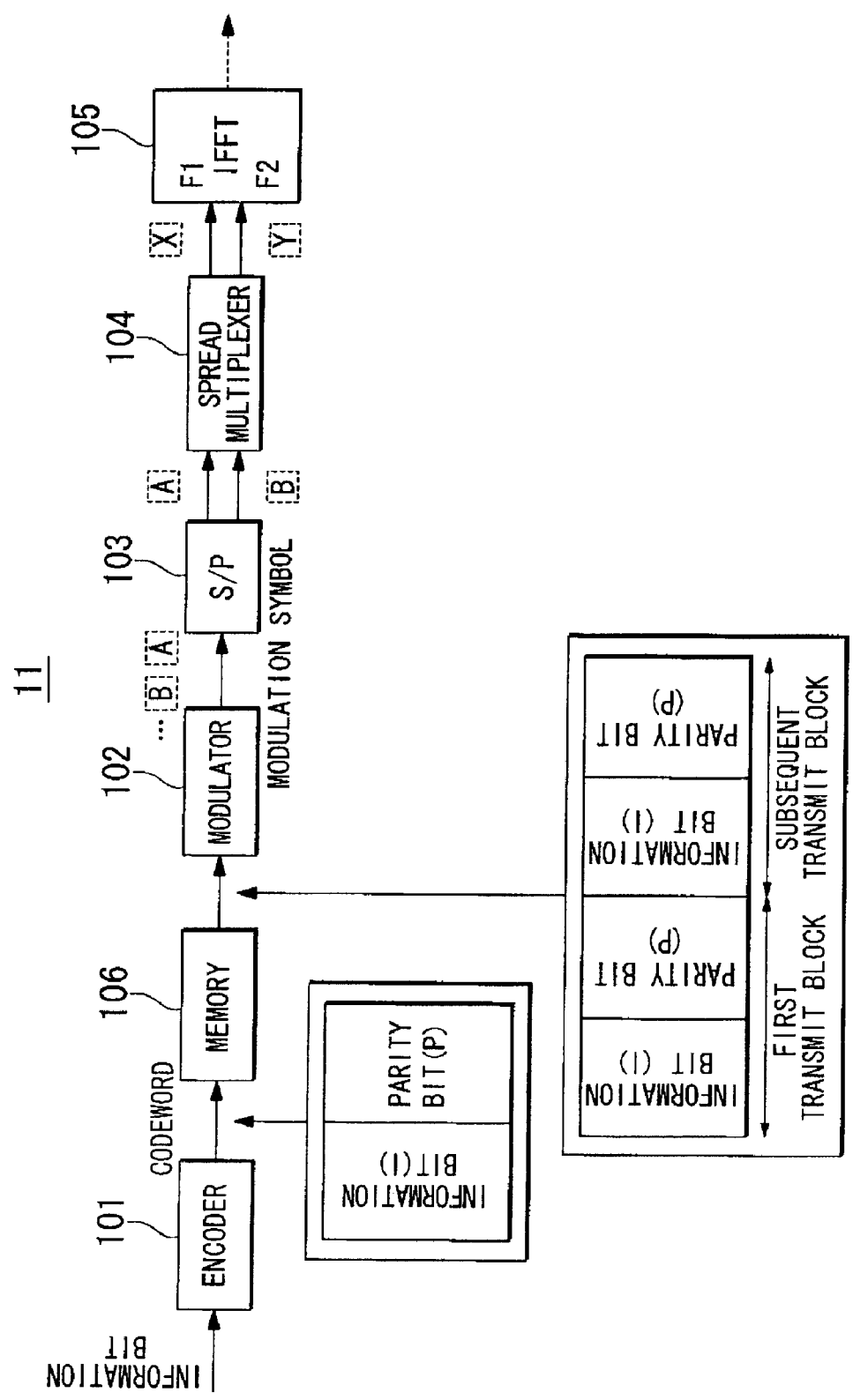
FIG. 3 is a block diagram showing a transmitting apparatus that operates by a digital signal transmission method according to a third embodiment.
Figure 4:
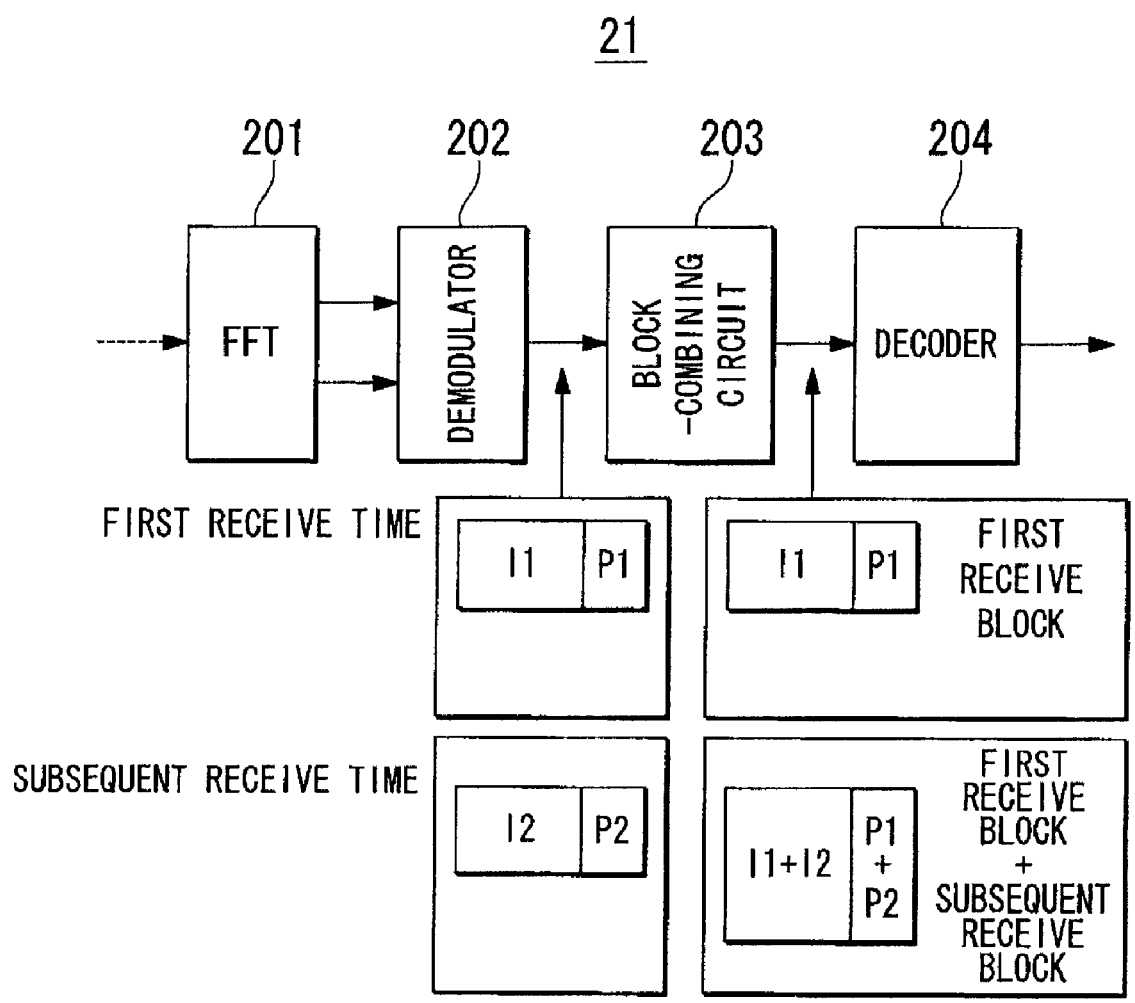
FIG. 4 is a block diagram showing a receiving apparatus that operates by a digital signal transmission method according to the third embodiment.

FIGS. 3 and 4 are explanatory diagrams of a digital signal transmission method according to a third embodiment of the invention, FIG. 3 being a block diagram of a transmitting apparatus 11, and FIG. 4, a block diagram of a receiving apparatus 21. This embodiment is based on HARQ using chase-combining.

FIG. 3 differs from the first embodiment in that a memory 106 is provided between the encoder 101 and the modulator 102. A codeword is duplicated in the memory 106 before being sent to the modulator 102, and is then separated into a block for each duplicated unit (i.e. each original codeword); these are transmitted sequentially as a first transmit block and a subsequent transmit block. The same operation can be realized when the memory 106 is arranged in a rear stage of the modulator 102.

In FIG. 4, a process corresponding to the first transmit block is then performed in the same manner as the first embodiment. When a subsequent transmit block is transmitted after decoding is unsuccessful with only the first transmit block, the block-combining circuit 203 combines the first transmit block and the subsequent transmit block at the same phase, and outputs to the decoder 204. The decoder 204 decodes the entire combined block and extracts the information bit.

In chase combining, which is the basic method of this embodiment, since the coding rate does not change according to the block for transmission, even if the spread multiplex code degree is reduced in second and later transmissions, transmission characteristics will not be enhanced. Also, since the blocks are combined at the same phase, the receive S/N increases in the second and later transmissions.

Accordingly, in this embodiment, the spread multiplex degree of the block for later transmission (subsequent transmit block) is made larger than the block transmitted first (first transmit block). When using a rotation code as the spread multiplex code, the rotation angle of the rotation code is increased for blocks later in the transmission sequence. In either case, since later transmissions have relatively fewer deterioration factors caused by inter-code interference and the like, transmission characteristics are enhanced.

Fourth Embodiment

Figure 5:
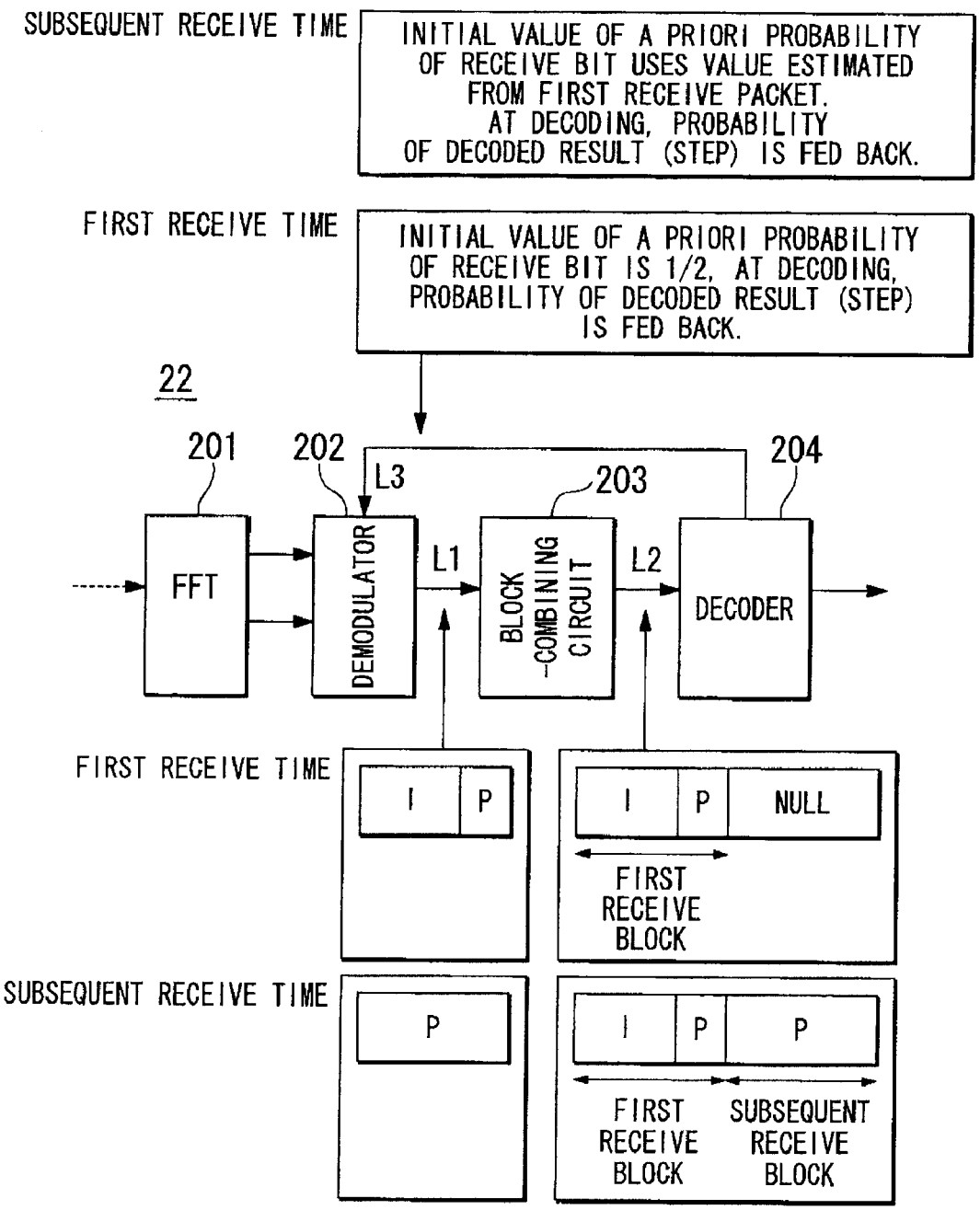
FIG. 5 is a block diagram showing another receiving apparatus that operates by a digital signal transmission method according to a fourth embodiment.

FIG. 5 is an explanatory diagram of a digital signal transmission method according to a fourth embodiment of the invention, being a block diagram of a receiving apparatus 22.

In FIG. 5, when processing a first receive block, a decoder 202 outputs a channel value L1 for a receive bit output from a fast Fourier transform 201, using ½ as the initial value for the a priori probability (receive probability) of each bit. A channel value L2 output from a block-combining circuit 203 is input to a decoder 204, which decodes it and outputs a channel value L3. The channel value L3 is fed back and input as a new a priori probability to the demodulator 202, which recalculates L1 based on L3. This feedback loop is thereafter repeated for a predetermined number of times and until predetermined conditions are satisfied, and a channel value L0 at the first receive time is thereby determined.

When processing a subsequent transmit block, the demodulator 202 outputs the channel value L1 using, as its initial value, an a priori probability estimated from channel value L0 obtained at the first receive time. The feedback loop is similarly repeated, and the final information bit is extracted.

Thus, the probability of a receive bit contained in a block that has not yet been received is estimated from the probability of the receive bit obtained in the decoding step of a past receive block, and a next block for reception is demodulated using this estimated probability, thereby increasing the decoding precision when processing the subsequent receive block and enhancing the transmission throughput.

While FIG. 5 depicts a receive block for processing using IR method, this embodiment can, of course, also be applied when using chase combining.

Figure 6:
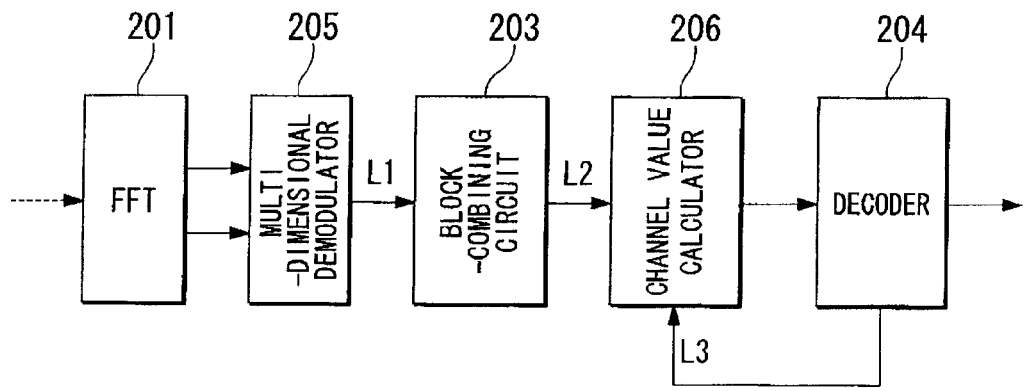
FIG. 6 is a block diagram showing another receiving apparatus that operates by a digital signal transmission method according to the fourth embodiment.

Furthermore, as shown in the block diagram of FIG. 6, similar effects can be obtained when the functions of the demodulator 202 in FIG. 5 are divided between a multi-dimensional demodulator 205 and a channel value calculator 206. In this case, the multi-dimensional demodulator 205 performs only a process of determining a most probable signal point at transmission time from the receive signal point. Based on the channel value L3 obtained from the decoder 204, the channel value calculator 206 performs a process of updating the channel value. An initial value of an a priori probability for a subsequent transmit block is then estimated from a channel value obtained after processing the first transmit block, using the same configuration as in FIG. 5.

Figure 7:
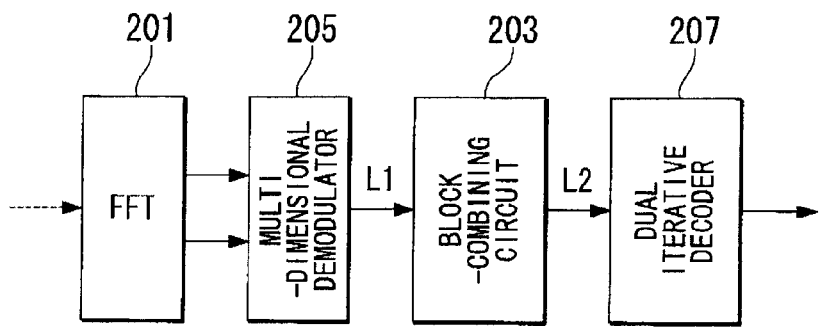
FIG. 7 is a block diagram showing a receiving apparatus that operates by a digital signal transmission method according to the fourth embodiment.
Figure 8:
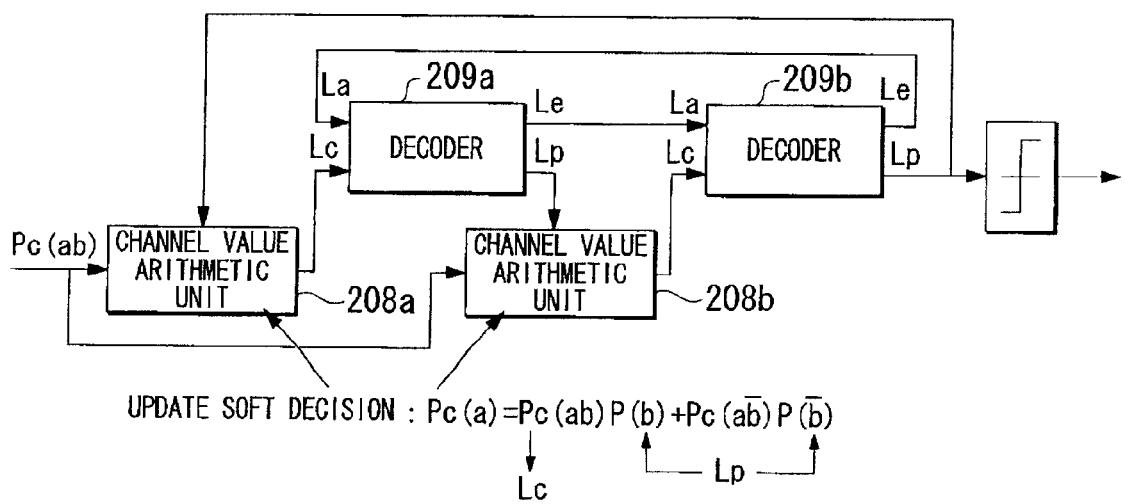
FIG. 8 is a block diagram showing an internal configuration of a dual iterative decoder in the receiving apparatus shown in FIG. 7.

As shown in the block diagram of FIG. 7, the decoder 204 and the channel value calculator 206 in FIG. 6 can be substituted by a dual iterative decoder 207, obtaining a receiving apparatus 24. FIG. 8 is a block diagram of the internal configuration of a dual iterative decoder 207. In FIG. 8, channel value arithmetic units 208a and 208b respectively use the probability Pc(aB) of a 2-bit symbol ab obtained from the multi-dimensional demodulator 205, and an a posteriori value P(b) obtained from decoders 209b and 209a, to calculate and sequentially update a soft decision value Pc(a) of symbol a in compliance with equation 3 below. A and B are constants or variables used in obtaining appropriate effects, and their values can be set at 1.

$$Pc(a) = A \cdot Pc(ab) \cdot P(b) + B \cdot Pc(a\bar{b}) \cdot P(\bar{b}) \quad \text{[Equation 3]}$$

While preferred embodiments of the invention have been described and illustrated above, its specific configurations are not limited to the above, and additions, omissions, substitutions, and other modifications can be made without departing from the spirit or scope of the present invention.

For example, when performing digital signal transmission using either of the transmitting apparatus and the receiving apparatus described above, a control can be incorporated whereby, before the receiving apparatus completes reception of all the blocks, when it is determined, from the results received and decoded up to that point, that the transmitted information bit has been successfully decoded, it can report this fact to the transmitting apparatus and cancel transmission of the remaining blocks. Since this can avoid transmission of unnecessary blocks, transmission characteristics can be further enhanced. Conversely, when the transmitted information bit is not successfully decoded, this fact can be reported to the transmitting apparatus, which is then made to transmit the remaining blocks.

INDUSTRIAL APPLICABILITY

The present invention can be applied in a digital signal transmission method, a transmitting apparatus, and a receiving apparatus, enabling transmission throughput to be enhanced and transmission to be performed at high-quality.

The invention claimed is:

1. A digital signal transmission method for modulating a codeword obtained by coding information bits to be transmitted, and transmitting modulation symbols obtained by the modulation with dividing into two or more blocks, comprising the step of:
transmitting a plurality of said modulation symbols on a plurality of subcarriers using rotation code multiplexing,
wherein the angle of a rotation code within a range from 0° to 45° applied to modulation symbols contained in the block early in the transmission sequence is greater than the angle of a rotation code within a range from 0° to 45° applied to the block later in the transmission sequence, where a rotation angle of 0° achieves a signal point arrangement identical to that of a non-multiplexed signal, a rotation angle of 45° achieves a signal point arrangement equivalent to that of a signal multiplexed with a Walsh-Hadamard code.

2. A digital signal transmission method for modulating a codeword obtained by coding information bits to be transmitted, and transmitting modulation symbols obtained by the modulation with dividing into two or more blocks, comprising the steps of:
obtaining a plurality of identical modulation symbols by duplicating and then modulating said codeword, or by modulating and then duplicating said codeword;
transmitting the plurality of identical modulation symbols on a plurality of subcarriers using spread multiplexing; and
demodulating the spread multiplexed signal being regarded as a modulation symbol without de-spreading,
wherein the number of code multiplexes of modulation symbols contained in the block early in the transmission sequence is greater than the number of code multiplexes of modulation symbols contained in the block later in the transmission sequence.

3. A digital signal transmission method for modulating a codeword obtained by coding information bits to be transmitted, and transmitting modulation symbols obtained by the modulation with dividing into two or more blocks, comprising the steps of:
obtaining a plurality of identical modulation symbols by duplicating and then modulating said codeword, or by modulating and then duplicating said codeword; and
transmitting the plurality of identical modulation symbols on a plurality of subcarriers using rotation code multiplexing,
wherein the angle of a rotation code within a range from 0° to 45° applied to modulation symbols contained in the block early in the transmission sequence is greater than the angle of a rotation code within a range from 0° to 45° applied to the block later in the transmission sequence, where a rotation angle of 0° achieves a signal point arrangement identical to that of a non-multiplexed signal, a rotation angle of 45° achieves a signal point arrangement equivalent to that of a signal multiplexed with a Walsh-Hadamard code.

4. A digital signal reception method for modulating a codeword obtained by coding information bits to be transmitted, and transmitting modulation symbols obtained by the modulation with dividing into two or more blocks, comprising the steps of:
starting decoding before receiving all said divided blocks;
predicting a receive probability of modulation symbols contained in a un-received block that has not yet been received based on a receive probability of decoded modulated symbols; and
when receiving said un-received block and demodulating a modulation symbol contained in that block, determining a channel value based on said predicted receive probability.

5. A digital signal transmission/reception method for modulating a codeword obtained by coding information bits to be transmitted, and transmitting modulation symbols obtained by the modulation with dividing into two or more blocks, comprising the steps of:
transmitting a plurality of said modulation symbols on a plurality of subcarriers using spread multiplexing; and
demodulating the spread multiplexed signal being regarded as a modulation symbol without de-spreading,
wherein a number of code spreads of modulation symbols contained in the block earlier in the transmission sequence is greater than a number of code spreads of modulation symbols contained in the block later in the transmission sequence, and
in transmitting and/or receiving, when said information bits are successfully decoded based on a decoded result up to that point before all said divided blocks are received, sending a report to the transmitting side so as to terminate transmission of the remaining blocks.

6. A digital signal transmission/reception method for modulating a codeword obtained by coding information bits to be transmitted, and transmitting modulation symbols obtained by the modulation with dividing into two or more blocks, comprising the steps of:
transmitting a plurality of said modulation symbols on a plurality of subcarriers using spread multiplexing; and
demodulating the spread multiplexed signal being regarded as a modulation symbol without de-spreading,
wherein a number of code spreads of modulation symbols contained in the block earlier in the transmission sequence is greater than a number of code spreads of modulation symbols contained in the block later in the transmission sequence, and
in transmitting and/or receiving, when said information bits are not successfully decoded based on a decoded result up to that point before all said divided blocks are received, sending a report to the transmitting side so as to transmit the remaining blocks.

7. A transmitting apparatus that modulates a codeword obtained by coding information bits to be transmitted, and transmits modulation symbols obtained by the modulation with dividing into two or more blocks, comprising:
a spread multiplexing unit that performs spread multiplexing whereby, when a plurality of said modulation symbols are transmitted on a plurality of subcarriers using spread multiplexing, and the spread multiplexed signal is regarded as a modulation symbol and demodulated without de-spreading in a receiving apparatus, a number of code spreads of modulation symbols contained in the block earlier in the transmission sequence is greater than a number of code spreads of modulation symbols contained in the block later in the transmission sequence,
wherein in transmitting and/or receiving, when said information bits are successfully decoded based on a decoded result up to that point before all said divided blocks are received, sending a report to the transmitting side so as to terminate transmission of the remaining blocks.

8. A transmitting apparatus that modulates a codeword obtained by coding information bits to be transmitted, and transmits modulation symbols obtained by the modulation with dividing into two or more blocks, comprising:
a spread multiplexing unit that performs rotation code multiplexing such that the angle of a rotation code within a range from 0° to 45° applied to modulation symbols contained in the block early in the transmission sequence is greater than the angle of a rotation code within a range from 0° to 45° applied to the block later in the transmission sequence, where a rotation angle of 0° achieves a signal point arrangement identical to that of a non-multiplexed signal, a rotation angle of 45° achieves a signal point arrangement equivalent to that of a signal multiplexed with a Walsh-Hadamard code.

9. A transmitting apparatus that modulates a codeword obtained by coding information bits to be transmitted, and transmits modulation symbols obtained by the modulation with dividing into two or more blocks, comprising:
a spread multiplexing unit that, when a plurality of said modulation symbols are transmitted on a plurality of subcarriers using spread multiplexing, and the spread multiplexed signal is viewed as a modulation symbols and is demodulated without de-spreading at the receiving apparatus, performs code multiplexing to a plurality of
identical modulation symbols obtained by duplicating and then modulating said codeword, or by modulating and then duplicating the codeword, such that the number of code multiplexes of modulation symbols contained in the block early in the transmission sequence is greater than the number of code multiplexes of modulation symbols contained in the block later in the transmission sequence.

10. A transmitting apparatus that modulates a codeword obtained by coding information bits to be transmitted, and transmits modulation symbols obtained by the modulation with dividing into two or more blocks, comprising:
a spread multiplexing unit that performs rotation code multiplexing to a plurality of identical modulation symbols obtained by duplicating and then modulating said codeword, or by modulating and then duplicating the codeword, such that
the angle of a rotation code within a range from 0° to 45° applied to modulation symbols contained in the block early in the transmission sequence is greater than the angle of a rotation code within a range from 0° to 45° applied to the block later in the transmission sequence, where a rotation angle of 0° achieves a signal point arrangement identical to that of a non-multiplexed signal, a rotation angle of 45° achieves a signal point arrangement equivalent to that of a signal multiplexed with a Walsh-Hadamard code.

11. A receiving apparatus, in digital signal transmission comprising modulating a codeword obtained by coding information bits to be transmitted, and transmitting modulation symbols obtained by the modulation with dividing into two or more blocks, the receiving apparatus comprising:
a demodulating unit that predicts a receive probability of modulation symbols contained in an un-received block that has not yet been received based on a receive probability of decoded modulated symbols, and, when receiving said un-received block and demodulating a modulation symbol contained in that block, determines a channel value based on said predicted receive probability.

12. A transmitting apparatus that modulates a codeword obtained by coding information bits to be transmitted, and transmits modulation symbols obtained by the modulation with dividing into two or more blocks, comprising:
a spread multiplexing unit that performs spread multiplexing whereby, when a plurality of said modulation symbols are transmitted on a plurality of subcarriers using spread multiplexing, and the spread multiplexed signal is regarded as a modulation symbol and demodulated without de-spreading in a receiving apparatus, a number of code spreads of modulation symbols contained in the block earlier in the transmission sequence is greater than a number of code spreads of modulation symbols contained in the block later in the transmission sequence, wherein in transmitting and/or receiving, when said information bits are not successfully decoded based on a decoded result up to that point before all said divided blocks are received, sending a report to the transmitting side so as to transmit the remaining blocks.

* * * * *